United States Patent
Tsai et al.

[11] Patent Number: 6,157,468
[45] Date of Patent: Dec. 5, 2000

[54] FOCUS ADJUSTING SYSTEM OF AN OPTICAL SCANNER

[75] Inventors: Chi-Ping Tsai, Hsinchu; Chien-Pang Huang, Pate, both of Taiwan

[73] Assignee: Microtek International Inc., Hsin-Chu, Taiwan

[21] Appl. No.: 09/034,166

[22] Filed: Mar. 2, 1998

[51] Int. Cl.$^7$ .................................................. H04N 1/04
[52] U.S. Cl. ........................................................ 358/488
[58] Field of Search .................................. 358/488, 486, 358/487, 497, 494, 474, 445; 250/201.2, 201.4, 208.1, 234; 348/96, 97, 345, 349

[56] References Cited

U.S. PATENT DOCUMENTS

| | | | |
|---|---|---|---|
| Re. 31,370 | 9/1983 | Mashimo et al. | 396/110 |
| 5,532,846 | 7/1996 | Brook et al. | 358/497 |
| 5,767,989 | 6/1998 | Sakaguchi | 358/474 |

*Primary Examiner*—Cheukfan Lee

[57] ABSTRACT

A focus adjusting system of an optical scanner which comprises an optical scanning module having a focus for scanning line images of a document line by line and converting each of the line images into a digital image signal set, and a scanning driver for driving the scanning module back and forth so as to scan the document. The focus adjusting system comprises a focus driver for adjusting the focus of the scanning module, and a focus controller for controlling the focus driver according to the digital image signal sets generated by the scanning module at various foci over a line position of the document so as to adjust the focus of the scanning module.

14 Claims, 4 Drawing Sheets

FOCUS ADJUSTING SYSTEM OF AN OPTICAL SCANNER

BACKGROUND OF THE INVENTION

1. Field of the Invention

The invention relates to an optical scanner, and more particularly, to an optical scanner with a focus adjusting system for adjusting its focus.

2. Description of the Prior Art

Prior art optical scanners usually comprise a scanning module with a fixed optical lens and light sensor for scanning a document in a fixed focus. It does not cause any problem if the resolution of the document image is not a great concern such as a text document. However, if the resolution of a document image is very important such as an artistic drawing or a color picture, a prior art scanner can not adapt its focus to capture the document image clearly since its focus is fixed. Many details of the document may be lost in such a document scanning.

SUMMARY OF THE INVENTION

It is therefore a primary objective of the present invention to provide an optical scanner with a focus adjusting system which can adjust the focus of the optical scanner to solve the above mentioned problem.

In a preferred embodiment, the present invention provides a focus adjusting system of an optical scanner which comprises an optical scanning module having a focus for scanning line images of a document line by line and converting each of the line images into a set of digital image signals, and a scanning driver for driving the scanning module back and forth so as to scan the document. The focus adjusting system comprises:

- a focus driver for adjusting the focus of the scanning module; and
- a focus controller for controlling the focus driver according to the digital image signal sets generated by the scanning module at various foci over a line position of the document so as to adjust the focus of the scanning module.

It is an advantage of the present invention that the focus adjusting system can adjust the focus of the optical scanner so that details of a document image can be clearly scanned by the scanner.

These and other objects and the advantages of the present invention will no doubt become obvious to those of ordinary skill in the art after having read the following detailed description of the preferred embodiment that is illustrated in the various figures and drawings.

DETAILED DESCRIPTION OF THE PREFERRED EMBODIMENT

Figure 1:
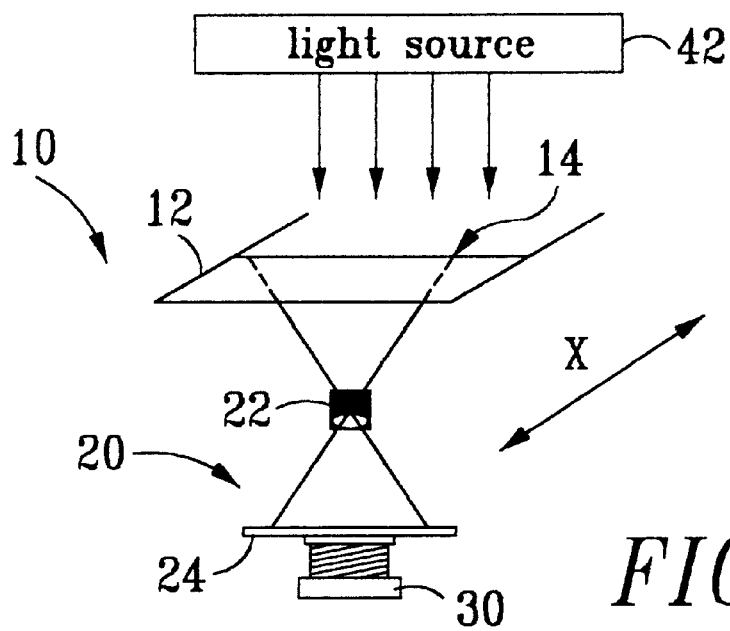
FIG. 1 is a diagrammatic view of an optical scanner according to the present invention.
Figure 3:
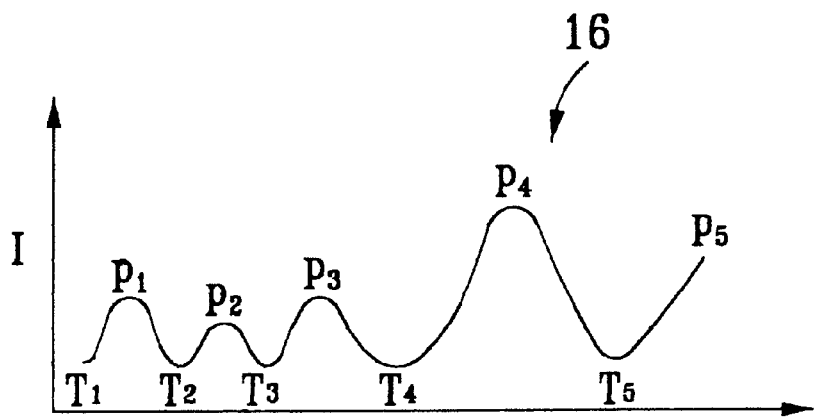
FIG. 3 is a chart of a set of digital image signals converted from one line image of the document shown in FIG. 1.
Figure 2:
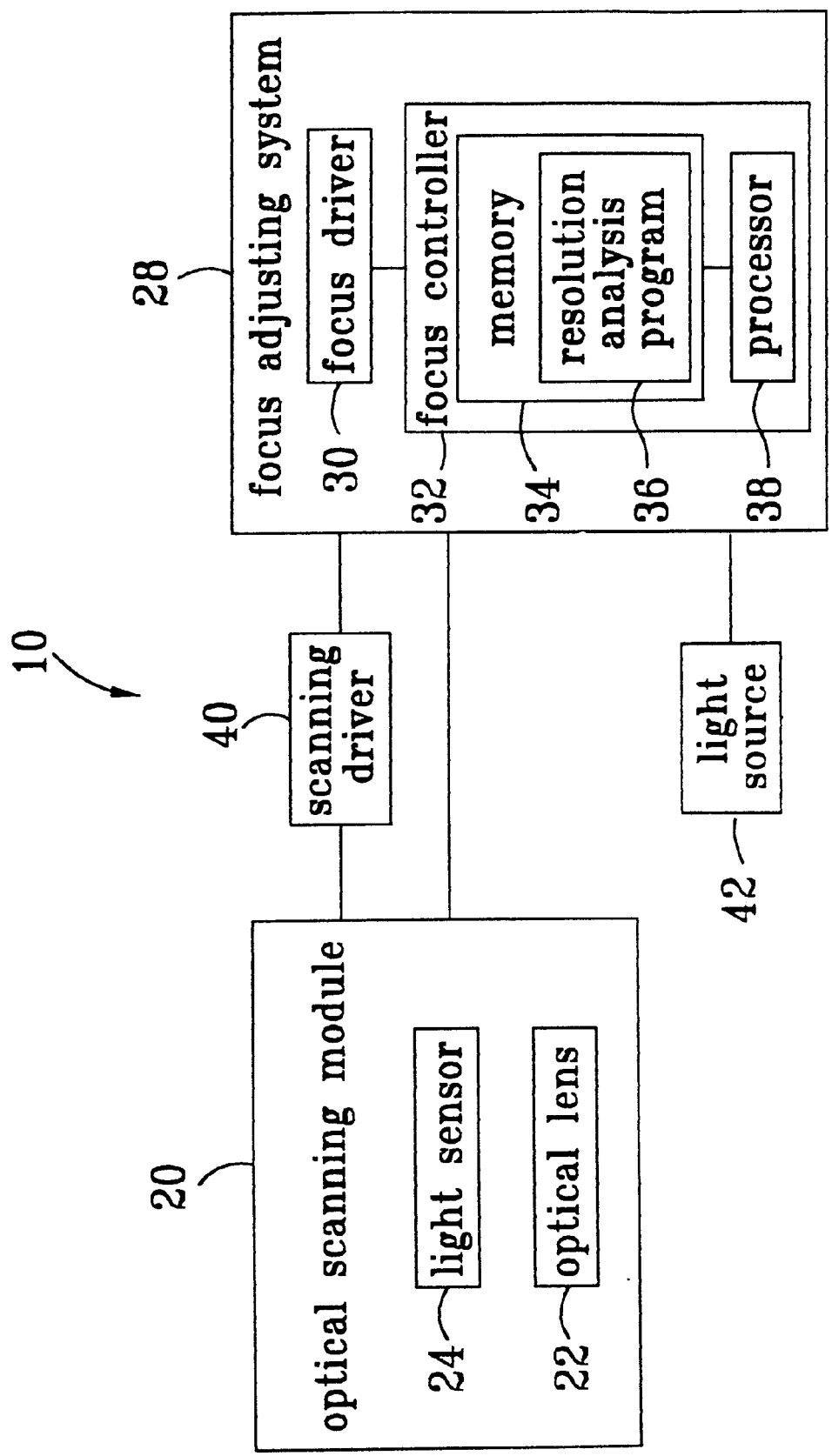
FIG. 2 is a function block diagram of the optical scanner shown in FIG. 1.

Please refer to FIGS. 1 to 3. FIG. 1 is a diagrammatic view of an optical scanner 10 according to the present invention. FIG. 2 is a function block diagram of the optical scanner 10. FIG. 3 is a chart of a digital image signal set 16 converted from one line image 14 of the document 12 shown in FIG. 1.

The optical scanner 10 comprises a light source 42, an optical scanning module 20, a scanning driver 40, and a focus adjusting system 28. The light source 42 is used for emitting light to a document 12 to be scanned. The scanning module 20 is used for scanning line images of the document 12 line by line and converting each of the line images into a set of digital image signals 16. It comprises a light sensor 24 for detecting the light emitted from the light source 42 and penetrated through the document 12, and an optical lens 22 for focusing the light from the document 12 on the light sensor 24. The focus of the scanning module 20 is defined as the distance between the optical lens 22 and the light sensor 24. The light sensor 24 is a charge coupled device (CCD) for converting each of the line images of the document 12 such as the line image 14 into a set of digital image signals 16.

The scanning driver 40 is used for driving the scanning module 20 back and forth along the X direction to scan the document 12. The focus adjusting system 28 is used for adjusting the focus of the scanning module 20 when scanning the document 12. It comprises a focus driver 30 for adjusting the focus of the scanning module 20 by moving the position of the light sensor 24 up and down, and a focus controller 32 for controlling the focus driver 30 according to the digital image signal sets generated by the scanning module 20 at various foci over a line position of the document 12 to adjust the focus of the scanning module 20. The line position used for adjusting the focus of the scanning module 20 such as the position of the line image 14, is called a focus adjustment position. In adjusting the focus of the scanning module 20, the focus driver 30 can move the position of the optical lens 22 instead of moving the light sensor 24.

The focus controller 32 comprises a memory 34, a resolution analysis program 36, and a processor 38. The memory 34 is used for storing the digital image signal sets 16 generated by the scanning module 20. The resolution analysis program 36 is stored in the memory 34 for analyzing the resolution of each of the digital image signal sets 16 according to a resolution analysis procedure and controlling the focus driver 30 to adjust the focus of the scanning module 20. The processor 38 is used for executing the resolution analysis program 36.

Figure 5:
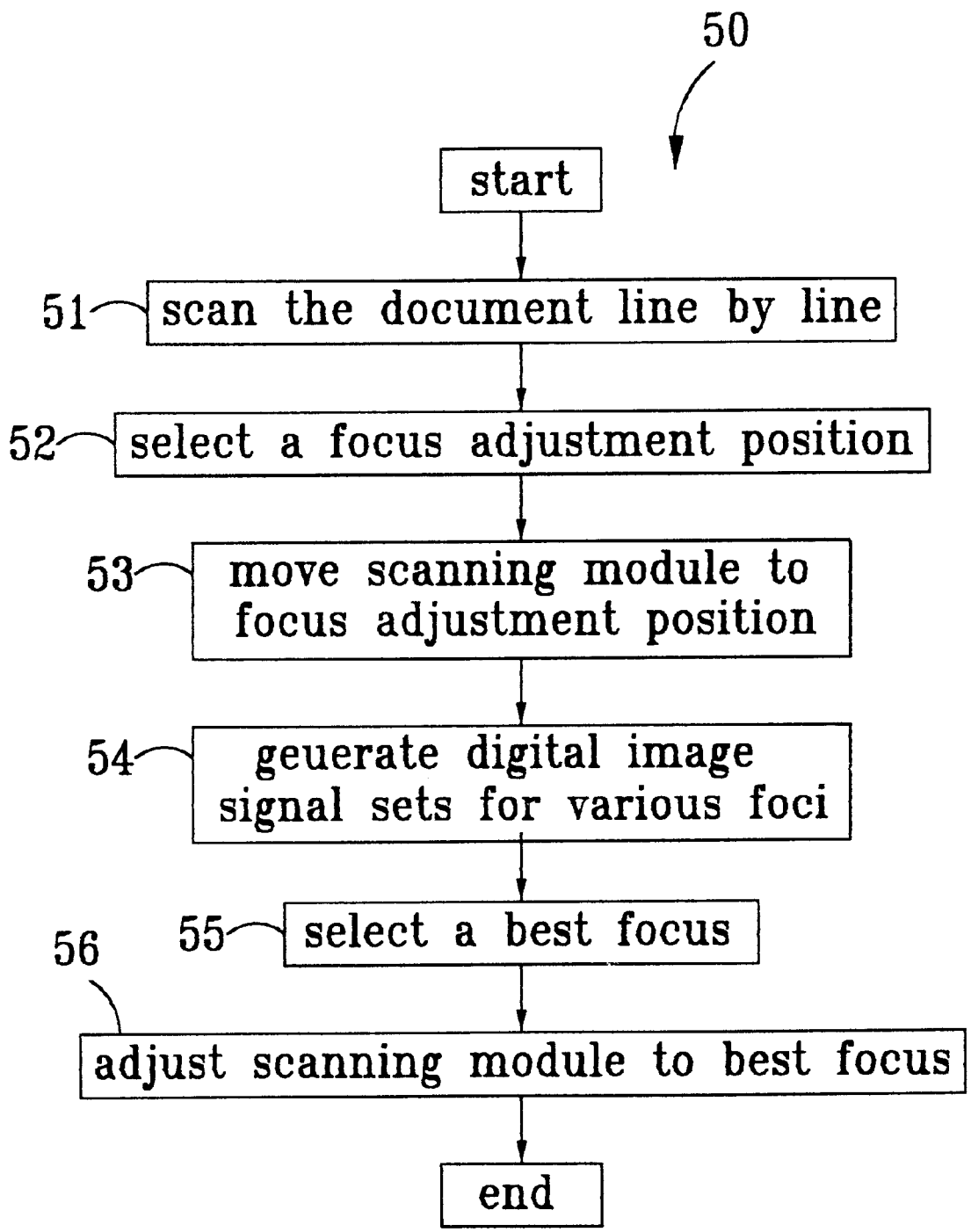
FIG. 5 is a process of adjusting the focus of the scanning module shown in FIG. 1.

Please refer to FIG. 5. FIG. 5 is a process 50 of adjusting the focus of the scanning module 20 shown in FIG. 1. The focus of the scanning module 20 is adjusted when the scanner 10 is making a preview scan. The process 50 is performed by the resolution analysis program 36 stored in the memory 34 of the focus controller 32. It comprises the following steps:

step 51: controlling the scanning driver 40 to drive the scanning module 20 forward to scan the document 12 line by line;

step 52: analyzing the digital image signals generated at each line position of the document 12 by using the resolution analysis procedure to find a digital image signal set 16 with the best resolution and selecting its position as a focus adjustment position;

step 53: controlling the scanning driver 40 to move the scanning module 20 to the focus adjustment position to adjust its focus;

step 54: controlling the focus driver 30 to adjust the focus of the scanning module 20 to various foci and using the light sensor 24 to generate one digital image signal set 16 for each of the foci;

step 55: analyzing the digital image signal sets 16 generated at all the foci according to the resolution analysis procedure to find a digital image signal set 16 with the best resolution and selecting the focus of the best digital image signal set 16 as a best focus;

step 56: controlling the focus driver 30 to adjust the focus of the scanning module 20 to the best focus to scan the document 12.

After the focus of the scanning module 20 is adjusted in the preview scan, the focus controller 32 can use the scanning driver 40 to drive the scanning module 20 to a front end of the scanner 10 to start a formal scan. Since the focus of the scanning module 20 has been adjusted to obtain the digital image signal set 16 with the best resolution, the image of the document 12 can thus be clearly scanned into the scanner 10 in its best resolution.

After the scanning module 20 is moved to the focus adjustment position in step 53, the resolution analysis program 36 selects the best digital image signal set 16 according to the following steps:

(1) recording the focus of a digital image signal set 16 as a first focus, analyzing the digital image signal set 16 according to a resolution analysis procedure to obtain a resolution, and recording it as a first resolution;

(2) recording the focus of another digital image signal set 16 as a second focus, analyzing the digital image signal set 16 according to a resolution analysis procedure to obtain a resolution, and recording it as a second resolution;

(3) comparing the first and second resolutions, and recording the second resolution as the first resolution and the second focus as the first focus if the second resolution is better than the first resolution; and (4) repeating steps (2) and (3) until all the digital image signal sets are compared, and recording the first resolution as the best resolution and the first focus as the best focus.

In the above process, the resolution analysis program 36 only needs to store two sets of resolutions and foci and one digital image signal set 16 in the memory 34, and thus requires very little memory space when selecting the best focus.

The resolution analysis procedure used by the resolution analysis program 36 analyzes a resolution of a digital image signal set 16 according to the following steps:

(1) locating each local maximum and local minimum contained in the digital image signal set 16 one by one;

(2) calculating a difference between each pair of neighboring local maximum and minimum; and (3) adding up all the differences to obtain a sum and using it as the resolution of the digital image signal set.

Figure 4:
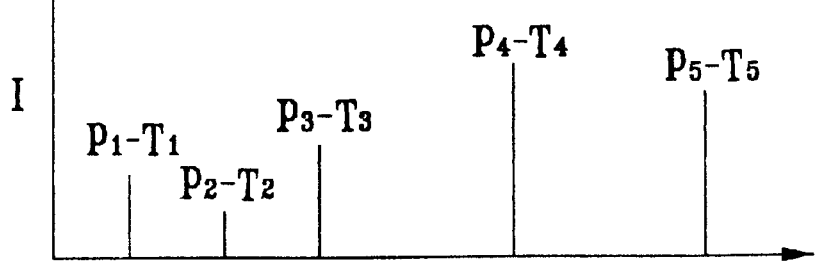
FIG. 4 shows differences between each pair of neighboring local maximum and minimum of the digital image signal set shown in FIG. 3.

The resolution analysis procedure will be illustrated by using the chart shown in FIG. 4. FIG. 4 shows differences between each pair of neighboring local maximum and minimum of the digital image signal set 16 shown in FIG. 3. When analyzing the digital image signal set 16 by using the resolution analysis procedure, each of the local minima $T_1, T_2, T_3, T_4, T_5$ and local maxima $P_1, P_2, P_3, P_4, P_5$ will be located first. The difference between each pair of local maximum and local minimum such as $(P_1-T_1)$, $(P_2-T_2)$, $(P_3-T_3)$, $(P_4-T_4)$, $(P_5-T_5)$, will then be calculated. The differences are added up to obtain a sum and it is used as the resolution of the digital image signal set 16.

Figure 6:
FIG. 6 shows a document to be scanned.
Figure 7:
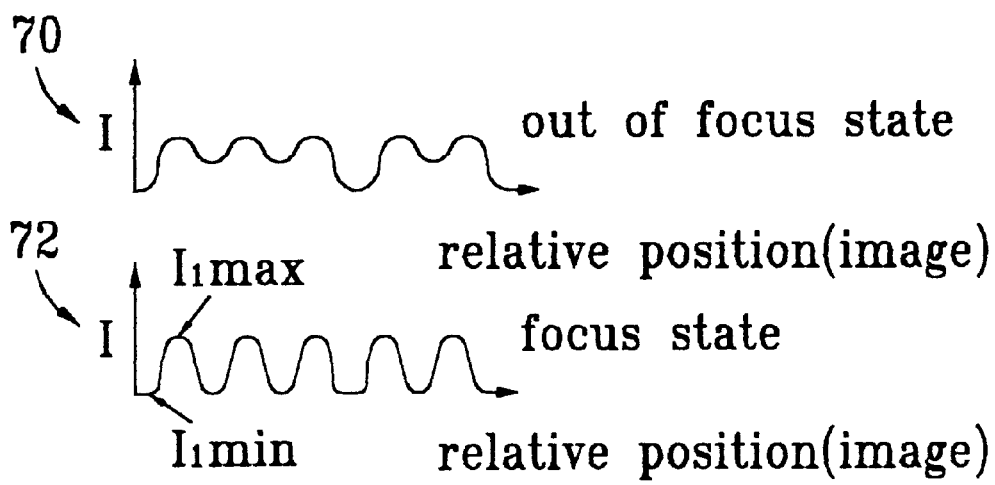
FIG. 7 shows two digital image signal sets converted from a line image of the document shown in FIG. 6 at two different foci.
Figure 8:
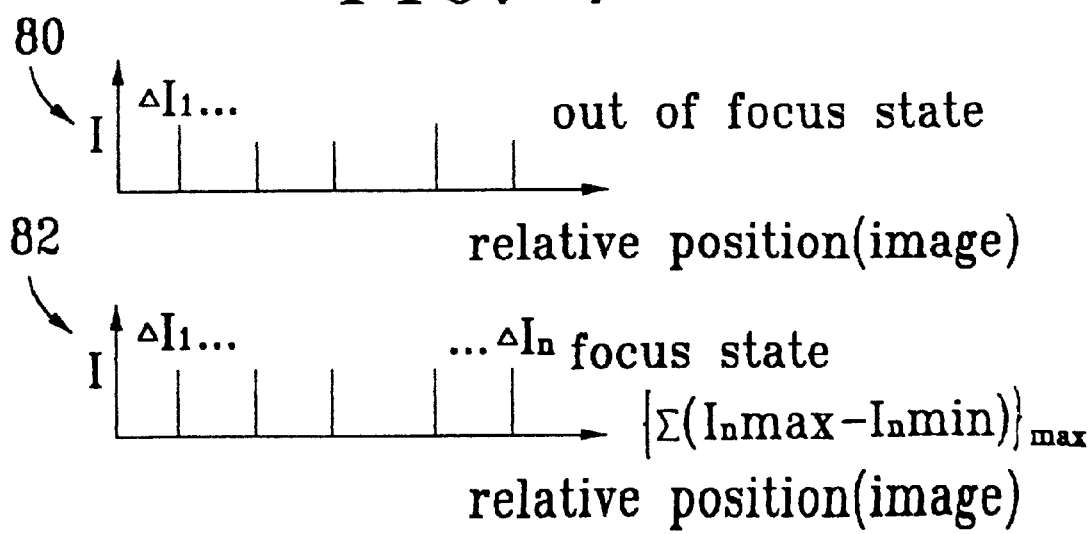
FIG. 8 shows the differences of each pair of neighboring local maximum and minimum of the two digital image signal sets shown in FIG. 7.

The reason for using the sum of all the differences between each pair of local maximum and local minimum is simple. The curves of the digital image signal set 16 of a line image taken at various foci by the scanning module 20 are very similar. But if the focus of the scanning module 20 is not in focus, the line image received by the light sensor 24 of the scanning module 20 will be vague. The digital image signal set 16 generated at such condition can not clearly present all the curves of the line image and thus will not have sharp contrast between each pair of local maximum and local minimum. The resolution obtained from the sum of all the differences in such condition will be low. On the contrary, if the scanning module 20 is in focus, the digital image signal set 16 will present sharp contrast between each pair of local maximum and local minimum and thus its resolution will be high. FIGS. 6 to 8 will present a focus adjustment example to illustrate such in-focus and out-of-focus situations.

Please refer to FIGS. 6 to 8. FIG. 6 shows a document 60 to be scanned. FIG. 7 shows two digital image signal sets 70 and 72 converted from a line image 62 of the document 60 at two different foci. FIG. 8 shows the differences of each pair of neighboring local maximum and minimum of the two digital image signal sets 70 and 72 shown in FIG. 7. Chart 80 is related to the digital image signal set 70 and chart 82 is related to the digital image signal set 72.

The digital image signal set 70 is generated when the line image 62 is not in focus, and the digital image signal set 72 is generated when the line image 62 is in focus. Comparing the charts 80 and 82, it clearly shows that the differences of each pair of neighboring local maximum and minimum of the digital image signal set 70 shown in chart 80 are smaller than the corresponding differences shown in the chart 82 in average, and thus the sum of all the differences shown in chart 80 will be smaller than the sum of the differences shown in chart 82. That means the resolution of the digital image signal set 70 is worse than the resolution of the digital image signal set 72.

The resolution analysis procedure is used by the resolution analysis program 36 in selecting both the focus adjustment position and the best focus. When locating the focus adjustment position in a preview scan, the resolution analysis program 36 compares the resolutions of the digital image signal sets 16 generated at various line positions to select a line position with the best resolution as the focus adjustment position so that the focus of the scanning module 20 can be properly adjusted. And when adjusting the focus of the scanning module 20 in the focus adjustment position, the resolution analysis program 36 compares the resolutions of the digital image signal sets 16 generated at various foci to select a focus with the best resolution.

Those skilled in the art will readily observe that numerous modifications and alternations of the device may be made while retaining the teachings of the invention. Accordingly, the above disclosure should be construed as limited only by the metes and bounds of the appended claims.

What is claimed is:

1. A focus adjusting system of an optical scanner which comprises an optical scanning module having a focus for scanning line images of a document line by line and converting each of the line images into a set of digital image signals, and a scanning driver for driving the scanning module back and forth so as to scan the document, the focus adjusting system comprising:

a focus driver for adjusting the focus of the scanning module; and a focus controller for controlling the focus driver according to the digital image signal sets generated by the scanning module at various foci over a line position of the document, analyzing each digital image signal set according to a resolution analysis procedure to find a digital image signal set with the best resolution, and selecting the focus of the best digital image signal set as a best focus, so as to adjust the scanning module to the best focus to scan the document;

wherein the resolution analysis procedure selects the best digital image signal set according to the following steps:

(1) recording the focus of a digital image signal set as a first focus, analyzing the digital image signal set to obtain a resolution, and recording it as a first resolution;

(2) recording the focus of another digital image signal set as a second focus, analyzing the digital image signal set to obtain a resolution, and recording it as a second resolution;

(3) comparing the first and second resolutions, and recording the second resolution as the first resolution and the second focus as the first focus if the second resolution is better than the first resolution; and (4) repeating steps (2) and (3) until all the digital image signal sets are compared, wherein the first resolution is the best resolution and the first focus is the best focus.

2. The focus adjusting system of claim 1 wherein the focus controller controls the scanning driver to drive the scanning module to scan the document line by line and generate a digital image signal set at each line position, analyzes the digital image signal set generated at each line position by using the resolution analysis procedure to find a digital image signal set with the best resolution and select its line position as a focus adjustment position, and then controls the scanning driver to move the scanning module to the focus adjustment position to adjust its focus.

3. The focus adjusting system of claim 1 wherein the focus controller comprises a memory for storing the digital image signal sets generated by the scanning module, a resolution analysis program stored in the memory for analyzing the resolution of each of the digital image signal sets according to the resolution analysis procedure and controlling the focus driver to adjust the focus of the scanning module, and a processor for executing the resolution analysis program.

4. The focus adjusting system of claim 1 wherein the resolution analysis procedure analyzes a resolution of a digital image signal set according to the following steps:

(1) locating each local maximum and local minimum contained in the digital image signal set one by one;

(2) calculating a difference between each pair of neighboring local maximum and minimum; and (3) adding up all the differences to obtain a sum and using it as the resolution of the digital image signal set.

5. The focus adjusting system of claim 1 wherein the scanning module comprises a light sensor for converting a line image of the document into a set of digital image signals, and an optical lens for focusing the line image of the document on the light sensor.

6. The focus adjusting system of claim 5 wherein the focus driver is used for moving the light sensor or the optical lens to adjust the focus of the scanning module.

7. A focus adjusting method for adjusting an optical scanner which comprises an optical scanning module having a focus for scanning line images of a document line by line and converting each of the line images into a digital image signal set, a scanning driver for driving the scanning module back and forth so as to scan the document, and a focus driver for adjusting the focus of the scanning module, the focus adjusting method comprising:

(1) selecting a line position of the document as a focus adjustment position;

(2) driving the scanning module to the focus adjustment position by using the scanning driver;

(3) adjusting the focus of the scanning module to various foci and generating one digital image signal set for each of the foci;

(4) analyzing the digital image signal sets according to a resolution analysis procedure to find a digital image signal set with the best resolution and selecting the focus of the best digital image signal set as a best focus;

(5) using the focus driver to adjust the scanning module to the best focus so as to scan the document;

wherein the resolution analysis procedure selects the best digital image signal set from all the digital image signal sets generated at the focus adjustment position according to the following steps:

(4a) recording the focus of a digital image signal set as a first focus, analyzing the digital image signal set to obtain a resolution, and recording it as a first resolution;

(4b) recording the focus of another digital image signal set as a second focus, analyzing the digital image signal set to obtain a resolution, and recording it as a second resolution;

(4c) comparing the first and second resolutions, and recording the second resolution as the first resolution and the second focus as the first focus if the second resolution is better than the first resolution; and (4d) repeating steps (4b) and (4c) until all the digital image signal sets are compared, wherein the first resolution is the best resolution and the first focus is the best focus.

8. The focus adjusting method of claim 7 wherein when selecting the focus adjustment position, it comprises the following steps:

(1) driving the scanning module to scan the document line by line by using the scanning driver and generating one digital image signal set at each line position; and (2) analyzing the digital image signals generated at each line position by using the resolution analysis procedure to find a set of digital image signals with the best resolution and selecting the line position of the best digital image signal set as the focus adjustment position.

9. The focus adjusting method of claim 7 wherein the optical scanner comprises a focus controller for controlling the focus driver according to the digital image signals generated by the scanning module so as to adjust the focus of the scanning module, over which the focus controller comprises a memory for storing the digital image signal sets generated by the scanning module over the focus adjustment position, a resolution analysis program stored in the memory for analyzing the resolution of each of the digital image signal sets according to the resolution analysis procedure and controlling the focus driver to adjust the focus of the scanning module, and a processor for executing the resolution analysis program.

10. The focus adjusting method of claim 7 wherein the resolution analysis procedure obtains the resolution of a digital image signal set according to the following steps:

(1) locating each local maximum and local minimum contained in the digital image signal set one by one;

(2) calculating a difference between each pair of neighboring local maximum and minimum; and (3) adding up all the differences to obtain a sum and using it as the resolution of the digital image signal set.

11. The focus adjusting method of claim 7 wherein the scanning module comprises a light sensor for converting a line image of the document into a set of digital image signals, and an optical lens for focusing the line image of the document on the light sensor.

12. The focus adjusting method of claim 11 wherein the focus driver is used for moving the light sensor or the optical lens to adjust the focus of the scanning module.

13. A focus adjusting method for adjusting an image input device which comprises an image sensing module having a focus for sensing an image and converting the image into a digital image signal set, and a focus driver for adjusting the focus of the image sensing module, the focus adjusting method comprising:

(1) adjusting the focus of the image sensing module to various foci and generating one digital image signal set for each of the foci;

(2) analyzing the digital image signal sets according to a resolution analysis procedure to find a digital image signal set with the best resolution and selecting the focus of the best digital image signal set as a best focus;

(3) using the focus driver to adjust the image sensing module to the best focus;

wherein the resolution analysis procedure selects the best digital image signal set from all the digital image signal sets generated at the focus adjustment position according to the following steps:

(2a) recording the focus of a digital image signal set as a first focus, analyzing the digital image signal set to obtain a resolution, and recording it as a first resolution;

(2b) recording the focus of another digital image signal set as a second focus, analyzing the digital image signal set to obtain a resolution, and recording it as a second resolution;

(2c) comparing the first and second resolutions, and recording the second resolution as the first resolution and the second focus as the first focus if the second resolution is better than the first resolution; and (2d) repeating steps (2b) and (2c) until all the digital image signal sets are compared, wherein the first resolution is the best resolution and the first focus is the best focus.

14. The focus adjusting method of claim 13 wherein the resolution analysis procedure obtains the resolution of a digital image signal set according to the following steps:

(1) locating each local maximum and local minimum contained in the digital image signal set one by one;

(2) calculating a difference between each pair of neighboring local maximum and minimum; and (3) adding up all the differences to obtain a sum and using it as the resolution of the digital image signal set.

* * * * *